A. H. GITS.
TRANSMISSION BELT.
APPLICATION FILED NOV. 24, 1909.
979,151.
Patented Dec. 20, 1910.
2 SHEETS—SHEET 2.
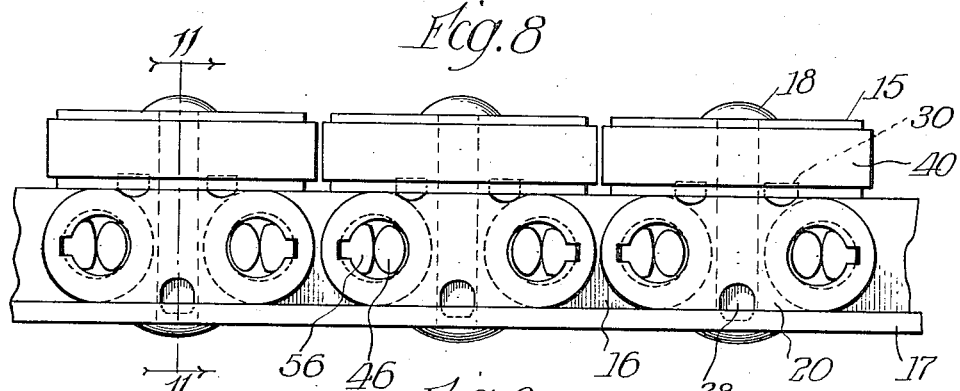
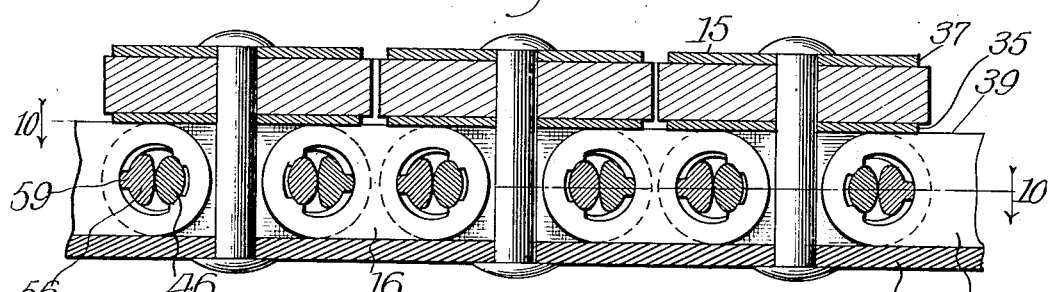
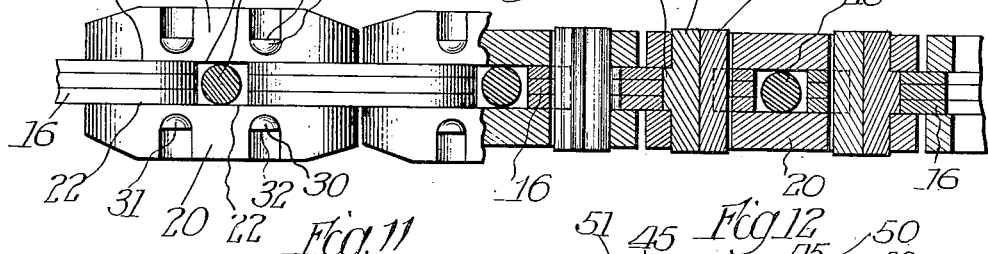
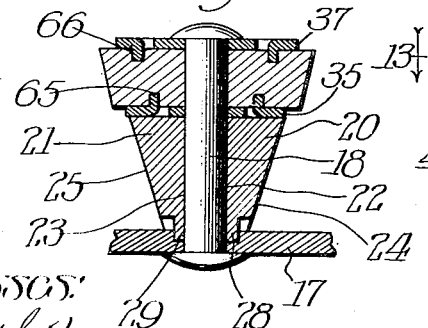
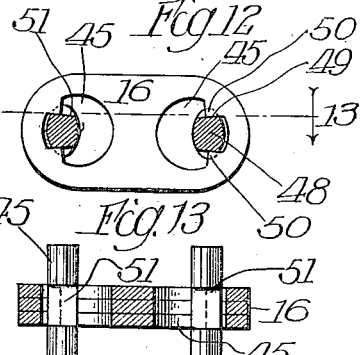
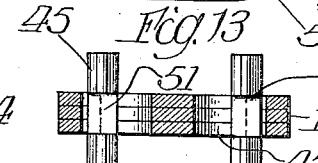
Witnesses:
Harold G. Barrett
Robert N. Weir
Inventor:
Alphons H. Gits.
by Cheever & Cox, Attys.

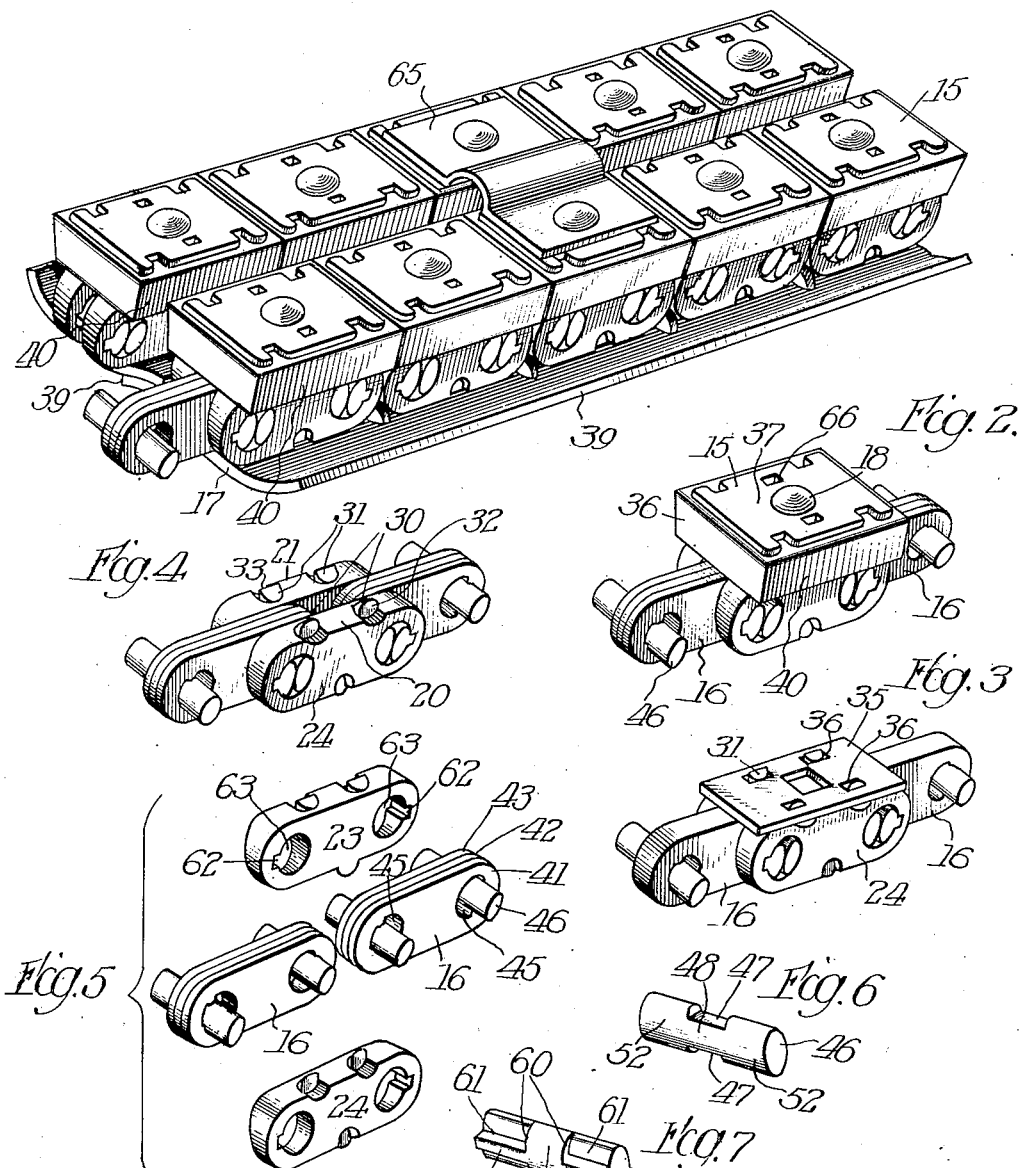

UNITED STATES PATENT OFFICE.

ALPHONS H. GITS, OF CHICAGO, ILLINOIS.

TRANSMISSION-BELT.

979,151.   Specification of Letters Patent.   Patented Dec. 20, 1910.

Application filed November 24, 1909. Serial No. 529,760.

*To all whom it may concern:*

Be it known that I, ALPHONS H. GITS, a citizen of the United States, residing at Chicago, in the county of Cook and State of Illinois, have invented a certain new and useful Improvement in Transmission-Belts, of which the following is a specification.

This invention relates to link chains of metal specially designed for use as transmission belts for power machinery.

The object of the invention is to provide such a device of large transmission capacity which can be very easily and cheaply made and put together so that it operates with very little friction and with consequent high efficiency.

The invention consists in a chain construction having rolling instead of sliding bearings at the joints of the chain, said chain being equipped with a flexible material gripping device so as to make engagement with the flanges of the pulleys over which the device runs; in a novel construction by which the chain may be made of relatively few simple parts, easily assembled into a chain of great strength and durability adapted to run without friction at the joints; and in a novel mechanism for yoking two chains together so that they run uniformly over a single pulley having a plurality of grooves thereby doing away with loss of power which occurs where two parallel chains are run over the same pulleys without any connection between them because one belt will be tight over the tops of the pulleys while the other will be tight over the bottoms of the pulleys, thereby subjecting the pulleys and belts to conflicting strains and reactions.

Figure 1 is a perspective view of a complete chain of this invention in its preferred form. Fig. 2 is a perspective view showing one link, for convenience hereafter called a primary link, and two connecting links, hereafter referred to as secondary links, adjacent thereto. Figs. 3, 4 and 5 show respectively successive stages occurring in taking the device of Fig. 2 apart. Figs. 6 and 7 show two different bearing pins removed from Fig. 2 used in connecting each primary and secondary link together. Fig. 8 is a side view of a complete chain illustrated in Fig. 1. Fig. 9 is a central vertical sectional view taken lengthwise of a chain adjacent to pins 18. Fig. 10 is a plan view partially in section taken on the irregular line 10—10, Fig. 9. Fig. 11 is a detail cross sectional view taken on the line 11—11 of Fig. 8. Fig. 12 is a side enlarged detail view of one of the secondary links showing the manner of securing the bearing pins therein. Fig. 13 is a sectional plan view taken approximately on the line 13—13 of Fig. 12.

In general construction this chain follows my Patent No. 875,426 for drive belt, issued December 31, 1907, that is to say; it consists of a plurality of primary links 15 connected together by secondary links 16 pivoted to the primary links and partially inclosed upon the wearing side by friction strips 17 of leather, or the like, secured broadly speaking, to the chain by rivets 18 passing vertically through the center of the primary links.

The primary links 15 are constructed of two bars 20 and 21 having respectively vertical faces 22 and 23 adapted to lie close to the vertical walls of the secondary links 16 and having inclined outside faces 24 and 25 corresponding in angularity to the walls of the groove of the pulley in which the chain is to run. Depending from the lower portions of the bars 20 and 21 are lugs or pins 28 and 29 and extending from the opposite upper faces of these bars are other projecting lugs 30 and 31 have oppositely faced substantially parallel vertical faces 32 and 33 respectively. Above these connecting members 20 and 21 is placed a connecting plate of metal 35 having therein, as best seen in Fig. 3, a plurality of perforations 36 adapted to be entered by the lugs 30 and 31 and adapted to be engaged by the faces 32 and 33 to thereby prevent spreading of the bars 20 and 21 away from each other. The plate 35 is covered with a block 36 of leather or hard rubber or the like and over this block 36 is placed a protecting metal plate 37.

Around the under portion of the successive primary links 15 of the chain and extending along the length of the chain is placed a strip, or belt, of soft friction material 17 such as leather so cut and shaped that the upper edges 39 will, when the device is ready for use, just lie in contact with the under sides of the blocks 36, whereby the material 17 and the edges 40 of the blocks 36 bear frictionally against the walls of the pulley in which the belt runs.

The secondary links 16 heretofore referred to are of approximately, though not necessarily, the same length as the bars 20 and 21 of the primary links and may be made of one piece of metal or, preferably, of a plurality of thin sheets 41, 42 and 43 secured together by any suitable means, as shown in Fig. 5. These secondary links normally lie between the bars 20 and 21 in the primary links, as shown in the different figures. Through each end of the secondary links heretofore described is a hole 45 of approximately circular form and in the side of each hole nearest the end of the link is secured a pin 46. This pin 46 is of a length equal to the combined thickness of the secondary link and the adjacent bars of the primary link and is secured to the secondary link by having notches 47 cut out of its upper and lower center portions, as shown in Fig. 6 so that the intermediate central portion 48 may fit in correspondingly shaped notches in the ends of the secondary links, as shown in specific detail in Figs. 12 and 13. The pin 46 is firmly secured in the ends of the link 16 by having the metallic portions 50 adjacent thereto bent or swaged down over the inclined faces 51 of the bottoms of the notches 47. These pins 46 are preferably thus secured in the secondary links 16 during the process of manufacture and are not, therefore, ordinarily removed. The pin 46 is so formed that when thus secured in position upon the link 16 the curved front face 52 of the pin contains the center of the holes 45 heretofore described, the curvature of the face being such that when a corresponding pin is placed adjacent thereto and rigidly connected to the bars of the primary links the faces of the two adjacent pins will roll on each other and thus afford a rolling bearing for the links of the chain, thereby doing away with the great wear which occurs where the sliding friction of an ordinary single pin joint is used.

The second or coacting pin just referred to is that marked 56 having the bearing face 57 adapted to bear against the face 52 heretofore referred to. The opposite face of this pin 56 is of peculiar construction consisting of a curved central portion 58, two ribs 59 running lengthwise of the pin from the central portion 58 to the end thereof, shoulders 60 being upon the ends of the portion 58 and forming the ends of recesses 61 on opposite sides of the rib 59. These ribs 59 are adapted to enter corresponding recesses 62 in the circular holes 63 formed in the bars 20 and 21 of the primary links, as shown, the shoulders 60 bearing against the adjacent inside walls 22 or 23, as the case may be, of the bars 20 and 21. The pin 56 is, as shown, of substantially the same length as the pin 46 and the pins are so proportioned that they both pass through the holes 45 and 63 of the links, there being, however, a little play between the parts so that when the faces 52 and 57 of two given pins are in rolling contact the face 58 of the pin 56 is not in frictional contact with any portion of the adjacent wall of hole 45.

In the assembling of the parts the operator first brings together two secondary links and the bars of a primary link, as shown in Fig. 5, he then places a pin 56 through each of the adjacent holes 45 of the secondary links and then places the bars 20 and 21 of the primary links in the position of Fig. 4, thereby through the action of the shoulders 60 locking the loose pin 56 in position so that it cannot drop out. He then proceeds to add the locking parts in the order shown in Figs. 3 and 2 and finally the friction belt 17 whereby the complete chain is formed in a very simple manner and without liability of coming apart or getting out of order, because the bars 20 and 21 lock the pin 56 in position, the plate 35 locks the bars 20 and 21 and the plates 36 and 37 together while the rivets 18 lock all these latter parts in position. The rivets are of such a size that they assist the central portions 58 of pins 56 in holding the bars far enough apart so that the secondary links may rock on the rolling joints without frictional engagement with the bars of the primary links. As the faces 52 and 57 roll upon each other instead of there being sliding friction the chain is frictionless and subject to very slight wear with the result that the device is very satisfactory in practice.

Where two chains or belts run parallel to each other in parallel grooves or pulleys there is almost always a difference in frictional contact with the pulleys, with the result that one chain works while the other does not, or they work in opposite direction, as heretofore stated, thereby subjecting the device to strain and breakage which should not take place. In order to avoid this difficulty two parallel chains are placed side by side, as shown in Fig. 1, and frequent pairs of parallel links are connected together by a bridge piece 65 engaged by the rivets 18 so that the two chains necessarily run in unison. More than two chains can thus be coupled.

To assist in assembling the primary links sharp prongs 65 are provided on plates 35, and prongs 66 are provided on plates 37, adapted to enter the material of blocks 36.

The claims are:

1. In a chain having successive primary and secondary links, the combination of a secondary link, a pair of bars of a primary link adjacent thereto, there being holes registering with each other through each of said parts, a pin through the bars and link rigidly secured to the end of the link, and a second detachable pin passing through said holes in said bars and link, there being means formed by the last mentioned pin and the bars of the primary link locking said pin in position, and curved faces upon said pins contacting with each other to provide rolling contact as the secondary link is rocked with reference to the primary link.

2. In a link chain having successive primary and secondary links, the combination of a pair of secondary links in line with each other, a pair of bars of a primary link embracing the two adjacent ends of the secondary links, pivotal connections between each pair of bars and the intermediate adjacent secondary links, a detachable plate in contact with the bars of the primary link bridging the secondary links, and means for securing said plate in contact with said bars whereby the primary link is formed and the secondary links are retained in position between the bars thereof.

3. In a transmission belt for power machinery, usable in connection with pulleys having parallel V shaped grooves, the combination of a plurality of chains each made up of a plurality of suitably connected V shaped links of substantially the same length adapted to work parallel to each other in the V shaped grooves of said pulleys and connectors between adjacent links of the two chains, adapted to bridge the flanges between said adjacent V shaped grooves of said pulleys and adapted to force said chains to travel in unison.

4. In a chain, a pair of secondary links in line with each other, two bars of a primary link on opposite sides of the secondary links, pivotal connection between the primary and secondary links, means connecting the bars, and a rivet passing through said connecting means and between said bars for the purposes set forth.

5. In a link chain having primary and secondary links, the combination of a secondary link member having alined pivot members projecting from opposite sides thereof, the faces of said members toward the center of the secondary link being curved, another pivot member passing through a hole in the secondary member adjacent to said pivot members which are upon the secondary link, said second pivot member having a curved face adapted for rolling engagement upon the curved faces of the pivot members upon the secondary link and a primary link comprising a pair of bars, and means for securing them together, there being holes in said bars adapted to receive and contain both the pivot members upon the secondary link and the second mentioned pivot member, said second mentioned pivot member being recessed in these parts which normally lie wholly within the bars of the primary link so as to form shoulders adjacent to the secondary link against which the bars of the primary link bear, whereby extraction of the second mentioned pivotal member is impossible without taking the primary link apart, and said second mentioned pivotal member is prevented from rotating with reference to the bars of the primary link.

6. In a link chain having primary and secondary links, a secondary link member, alined pivot members projecting from opposite sides thereof, the same being formed of a single piece of metal secured to the secondary link by having its central portion notched and thus reduced in size so as to fit within a notch formed in one side of a hole passing through the secondary link, a primary link comprising a pair of bars adapted to lie on opposite sides of the secondary link in combination with means for detachably securing said bars together, said bars being provided with holes near their ends in which the first mentioned pivotal member enters, a second pivotal member locked within the corresponding holes in the secondary link and the adjacent bars of the primary link, the second mentioned pivot member being rigidly secured to the bars of the primary link by notched engagement therewith, the notches also forming shoulders upon the second mentioned pivot member which prevent its passing through the bars of the primary link when the parts are in assembled position, there being rolling surfaces formed upon the faces of the two pivotal members, which are adjacent to each other, whereby, as said links rock with reference to each other, said pivot members roll over each other for the purposes set forth.

7. In a chain of the class described, the combination of a secondary link 16 having near its end a hole 45 through which a pivot member 46 is inserted, the pivot member being secured in rigid position with reference to the link by having its central portion 48 reduced in the notches 47 so that said central portion fits within a notch 49 formed in that side of the hole 45, which is farthest from the center of the link 16, a primary link comprising a pair of side bars 20 and 21 and means for securing them together, said bars having holes 63 therein within which the ends 52 of the pivotal member 46 are adapted to lie, and a second pivotal member 56 having a central portion 58 terminating in shoulders 60 running into recesses 61, forming ribs 59 entering notches 62 of the side bars of the link, thereby holding said pivotal member 56 rigidly with reference to the primary link, each of said pivot members 46 and 56 being respectively provided with curved faces 52 and 57 which are adapted to roll upon each other when the links are in assembled position, all as shown and described, for the purposes set forth.

In witness whereof, I have hereunto subscribed my name in the presence of two witnesses.

ALPHONS H. GITS.

Witnesses:
 DWIGHT B. CHEEVER,
 MARGARET D. ROBB.